Patented Aug. 6, 1940

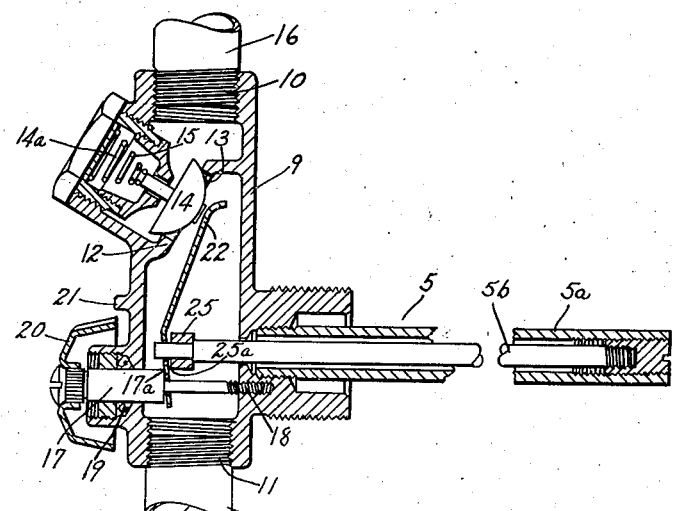
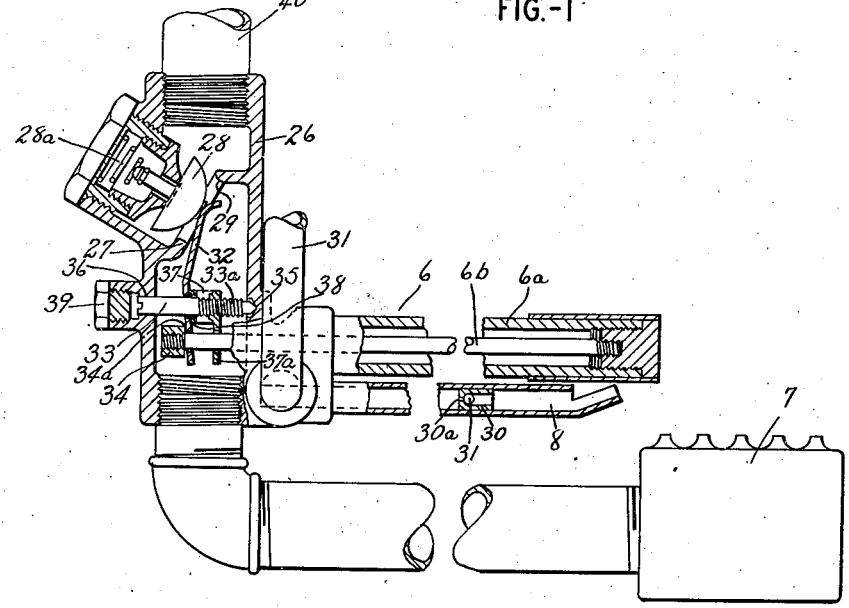
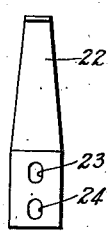
FIG.-1
FIG.-2
INVENTOR
JOSEPH A. CERNY

2,210,446

UNITED STATES PATENT OFFICE 2,210,446

THERMOSTATIC CONTROL MECHANISM

Joseph A. Cerny, Cleveland, Ohio, assignor to The Titan Valve and Manufacturing Company, Cleveland, Ohio, a corporation of Ohio Application December 9, 1937, Serial No. 178,926

2 Claims. (Cl. 236—102)

This invention relates to improvements in thermostatic control mechanism.

An object of the present invention is to provide a simple thermostatic control involving a small number of parts easily assembled.

Another object of the invention is the provision of an operative connection between a thermostatic element and a control member consisting of a single lever having operative connections at one end with the control member and at its other end with the thermostatic element. My invention provides in such a control an arrangement whereby the movement of the thermostatic element is multiplied many times so as to give a quick acting control device.

My invention also provides a very compact device requiring for its housing, little more than the usual passage for feeding fuel to the apparatus controlled. In such an arrangement I also provide a thermostatic control mechanism which may be assembled through one of the openings of the fluid pasageway which normally accommodates the flow of fuel. Such a device will take up very little room in assembled apparatus.

My invention also provides in a thermostatic control device including a lever, a special arrangement of fulcrums controlling lever movement. This arrangement is easily assembled for accurate operation and involves a minimum number of cheaply constructed parts.

Other objects and advantages of the invention will be apparent from the accompanying specification and drawing and the essential features will be summarized in the claims.

In the drawing, Fig. 1 is a sectional view showing two of my improved thermostats assembled in series for producing two different control operations in an apparatus with which they are associated; the two thermostats shown embody slightly different forms of my invention; while Fig. 2 is an elevational view of the lever shown in the uppermost thermostat of Fig. 1.

My improved thermostatic control mechanism is useful in a great many of thermostatically controlled operations and for purposes of illustration I have shown an arrangement including a thermostat 5 of a type which might be used in a water heater or the like, and a thermostat 6 which is useful as a control member in a safety pilot device in conjunction with a burner diagrammatically illustrated at 7, such as might be provided for heating the water in the water heating apparatus. While other parts of the water heating equipment are not shown, it is well known that the thermostat 5 is generally submerged in the heated water reservoir to which heat is supplied by a burner such as that shown at 7 with a safety pilot as shown at 8 embodying a safety feature whereby the fuel supply to the pilot is turned off by the thermostat 6 in case the pilot is extinguished. In modern forms of water heating apparatus this equipment is housed in a more or less decorative cabinet or casing and it is desirable that the thermostat control equipment be incorporated in the apparatus without too greatly increasing the bulk thereof. An advantage of the present invention is that the equipment takes up little more room than the usual supply pipes for gas or the like.

While the details of the thermostat construction are immaterial except insofar as they must be coordinated with other parts of the control mechanism to produce the movement desired, I have illustrated similar thermostats at 5 and 6 of a well known type. In each case the outer tube 5a, 6a is of a material having a relatively large coefficient of expansion and the inner rod 5b, 6b is of material having a relatively small coefficient of expansion so that in each case illustrated when the outer tube cools and contracts it moves the rod toward the left, and vice versa as the outer tube is heated it moves the inner rod toward the right.

Referring now to the thermostat shown at 5, a casing 9 has a fuel inlet opening at 10 and a fuel outlet opening at 11. Intermediate these openings the casing is provided with a diagonal partition 12 having a port therethrough 13 which is opened and closed by a valve 14 spring pressed toward closed position by the spring 15. By this arrangement of port 13 and valve 14, fluid flow through casing 9 is in substantially a straight line and it will be noted that the dimensions of the casing are little if any greater than the pipe 16 which supplies fuel to the burner. The arrangement shown gives a decreased pressure drop through the casing as compared with a valve arranged at right angles. Also the valve on the diagonal gives greater movement for lever 22 for a casing of given width. The thermostat rod 5b extends transversely of casing 9, entering from one side of the casing near the outlet opening 11. An adjusting rod 17 also extends transversely of the casing substantially parallel to rod 5b and entering from the opposite side of the casing also near the outlet opening, 11. The adjusting rod 17 has a threaded engagement at 18 with the casing and is surrounded by packing at 19 to prevent fuel leakage. At its outer end this rod has an adjusting knob 20 which may be suitably graduated so that by reference to a point 21 on the casing the adjusting knob may be set to determine the temperature range of the device as will hereinafter appear. A lever 22 at one end engages valve 14 and at its other end is provided with a pair of openings 23 and 24 as best seen in Fig. 2, preferably elongated as there shown to permit the movements later described.

When the apparatus is assembled, rod 5b passes through opening 23 and the rod 17 through opening 24. Rod 5b carries a collar 25 provided with an annular shoulder 25a and the larger end portion of rod 17 forms a collar which is provided with an annular shoulder 17a. It will be noted that lever 22 has its lower end bent at an angle so that the collar 25 at the edge of shoulder 25a provides a sharp fulcrum engaging the right hand surface of lever 22, while the edge of shoulder 17a of rod 17 forms a sharp fulcrum engaging the left hand surface of lever 22. These two fulcrums are spaced apart lengthwise of lever 22 and preferably as shown this spacing is very small as compared with the length of lever 22, being substantially an amount no greater than the thickness of the lever, which is of thin sheet metal, so that a turning action of the lever caused by slight relative movement between the fulcrums produces great multiplication of the movement of the free end of lever 22. It results from this construction that very slight movements of the thermostat rod 5b are translated into relatively large movements of the free end of lever 22, thus causing wide and rapid opening and closing of valve 14 due to thermostatic control. Because of this great multiplication in the lever, the valve 14 and its port may be small like those used in snap acting devices and need not be large like those generally found in direct acting thermostat controls.

It will be obvious that if no adjustment were desired, the fulcrum at 17a might be fixed with respect to casing 9 but such a device would be of very limited commercial usefulness. It will be evident therefore that by turning knob 20 the position of the fulcrum at 17a may be adjusted so as to cause the thermostat rod to open valve 14 at any temperature desired within the range of the device.

It will be obvious from the description thus far that when tube 5a cools and contracts, rod 5b will move toward the left causing counterclockwise movement of lever 22 about the edge of shoulder 17a and opening valve 14 against its spring 14a. Likewise upon heating of tube 5a, rod 5b will move toward the right, allowing spring 14a to close valve 14 and returning lever 22 toward the right. It is this action of spring 14a which in operation holds lever 22 in engagement with its controlling fulcrum points.

It will be obvious that the parts just described are easily assembled through the opening 11. With the thermostat rod 5b in place, lever 22 may be inserted in the casing with rod 5b passing through the opening 23. While the lever is thus held in place, rod 17 may be passed through opening 24 and threaded into the casing at 18 whereupon the parts are completely assembled and after a simple adjustment are ready to operate. The lever 22 is held properly alined with valve 14 by reason of the two rods entering the openings 23 and 24.

While lever 22 may assume various forms, it is preferably and cheaply made of a strip of flat thin metal having spring characteristics so that the lever will flex if there is any attempt to force the parts.

The control mechanism in conjunction with thermostat 6 is similar in principle to that just described although differing in detail. Here the casing 26 with its inlet and outlet openings, its diagonal partition 27, valve 28, opening and closing port 29 and valve spring 28a are similar to the parts already described. Gas from supply tube 31 passes out through the safety pilot tube 8 controlled by orifice 30a in the plug 30 which is tightly fitted inside of tube 8. Openings 31 are drilled through the tube and plug to provide air supply to the pilot flame. It will be understood that tube 31 is connected into pipe 16 ahead of casing 9.

Within casing 26 is lever 32 having its upper end engaging valve 28 and having two openings through its lower end through the upper one of which passes the adjusting rod 33 and through the lower one of which passes the thermostatic rod 6b. On rod 6b is the collar 34, an edge of the annular shoulder of which engages the left hand surface of lever 32 at 34a in what is substantially a point contact. Rod 33 has bearings 35 and 36 in two walls of casing 26 respectively. This rod also has a threaded portion 33a engaging a special nut 37, forming a collar having an annular shoulder, the edge of which forms a fulcrum 38. Since this portion of the nut is square its fulcrum 38 is a sharp shoulder giving substantially a line contact with the right hand surface of lever 32. A depending flange 37a on the nut has an opening through which rod 6b passes so as to prevent rotation of nut 37 when adjusting rod 33 is turned. The rod 33 at its outer end has a slot to accommodate a screw driver and the adjustment opening is closed by a plug 39 to prevent gas leakage and to prevent tampering. The distance between fulcrums at 34a and 38 is again very short compared to the length of lever 32 so that slight thermostatic movement is multiplied into much greater valve movement.

Here again the parts may be assembled through the outlet opening of casing 26 by placing nut 37 and lever 32 in position on rod 6b and thereafter inserting adjusting rod 33 and finally threading collar 34 onto rod 6b.

The operation of this safety pilot mechanism is as follows: When the pilot fuel supply is turned on and the gas or other fuel emanating from tube 8 is lit, the thermostat tube 6a will be heated causing movement of rod 6b to the right which will produce counterclockwise movement of lever 32 about the fulcrum at 38. This will open valve 28 against the action of spring 28a and the valve will be held open as long as the pilot remains lighted. If the pilot should be extinguished and tube 6a contracts, rod 6b will move toward the left permitting clockwise movement of lever 32 as spring 28a moves valve 28 to closed position.

When the apparatus shown in Fig. 1 is assembled in water heating equipment as previously mentioned, casings 9 and 26 will be connected by pipe 40 and valve 28 will be normally open as long as the pilot 8 is lit. Thereafter fuel will be supplied through valve 14 to burner 7 in response to the requirements of thermostat 5.

While I have described the use of levers 22 and 32 in the simple device disclosed, I may use the same structure in conjunction with more complicated mechanism for producing results in addition to those possible with the simple structure.

2,210,446